2,833,789

HALOSALICYLOYLAMIDOANTHRAQUINONES

Vito A. Giambalvo and Robert J. Alheim, Middlesex Borough, N. J., assignors to American Cyanamid Company, New York, N. Y., a corporation of Maine No Drawing. Application January 30, 1956
Serial No. 562,015

6 Claims. (Cl. 260—377)

This invention relates to 1-(3-halosalicyloylamido)-anthraquinones.

A number of anthraquinone compounds have been used as pigments as well as vat dye stuffs, among them 1-salicyloylamidoanthraquinone. This is a yellow pigment and has a desirable greenish shade. The green shade yellow is important for many uses particularly where the pigment is used with blue pigments to form green coating compositions. A red shade yellow tends to produce duller, or dirtier looking colors when used with blues, such as for example copper phthalocyanine. In spite of the desirable green shade the 1-salicyloylamidoanthraquinone has a very serious drawback for use as a pigment. Its solubility in the important solvents used in formulating enamels and lacquers is too high. This causes the pigment to bleed which is undesirable when a number of colors are applied to the same object. For this reason 1-salicyloylamidoanthraquinone in spite of its desirable shade and good light-fastness has not been practical for many uses because of its poor bleed resistance.

The introduction of a halogen, for instance chlorine, in the 5-position on the salicyloyl ring increases the tendency to bleed.

Surprisingly, the introduction of halogen into the 3-position markedly decreases the tendency to bleed of the product, and yet does not change the shade.

A 1-(3-halosalicyloylamido)-anthraquinone including 1-(3,5-dihalosalicyloylamido)-anthraquinone has excellent bleed resistance. No theoretical explanation is offered for this highly anomalous behavior. These halosalicyloylamidoanthraquinones also exhibit superior light-fastness.

The products of the present invention find their most important practical use as pigments in lacquers, enamels or similar coating compositions where bleed resistance is important. It should be understood that the compounds can also be used as vat dyes to dye cellulosic fabrics, such as cotton by ordinary dyeing methods, including textile printing, and for plastic coloring where the pigment is incorporated in the plastic, including "dope-dyeing."

It is an advantage of the present invention that the compounds can be transformed into pigments of excellent covering power by conventional means for increasing the strength of pigments, such as acid pasting, grinding with a grinding aid which is usually referred to in the art as salt milling, and the like.

The present invention is not limited to one particular process of making the compounds but it is an advantage that simple processes can be used, such as reacting the acid chloride of the respective halosalicylic acid with alpha-aminoanthraquinone in suitable solvents such as nitrobenzene, ortho-dichlorobenzene, or chloronaphthalene, or their mixtures. Nitrobenzene gives excellent results and is a preferred reaction medium.

These compounds may also be produced by reacting an alpha-haloanthraquinone with an amide of the halosalicylic acid.

In the method using alpha-aminoanthraquinone, the acid chloride of the halosalicylic acid may be added to the alpha-aminoanthraquinone in the solvent such as nitrobenzene, and the mixture heated until the reaction is complete; however, it is often convenient to add a condensing agent such as thionyl chloride to a mixture of the halosalicylic acid and alpha-aminoanthraquinone in the solvent, and heat, thus forming the halosalicylic acid chloride in situ. In such cases it is desirable to introduce the thionyl chloride gradually below the surface of the reaction medium and to be sure of very thorough distribution.

Some experts regard the insolubility of a pigment in a solvent such as xylene as a measure of properties associated with bleed resistance of the pigment. The lower the solubility, the better the bleed resistance. The solubility of certain of the present pigments in xylene at 35° C. are:

| | Mg./liter |
|---|---|
| 1-salicyloylamidoanthraquinone | 850 |
| 1-(5-chlorosalicyloylamido)-anthraquinone | 3200 |
| 1-(3,5-dichlorosalicyloylamido)-anthraquinone | 220 |
| 1-(3,5-dibromosalicyloylamido)-anthraquinone | 350 |
| 1-(4-chlorosalicyloylamido)-anthraquinone | 580 |
| 1-(3-chlorosalicyloylamido)-anthraquinone | 70 |

This invention will be described in greater detail in conjunction with the following specific examples in which the parts are by weight unless otherwise specified.

EXAMPLE 1

*1-(3,5-dichlorosalicyloylamido)-anthraquinone*

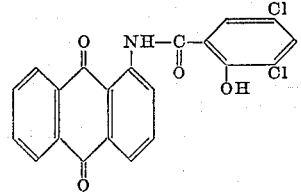

22.3 parts of alpha-aminoanthraquinone and 21.7 parts of 3,5-dichlorosalicylic acid are added to 300 parts of nitrobenzene. The suspension is heated to 105° C. and 15.5 parts of thionyl chloride dissolved in 24 parts of nitrobenzene added gradually, maintaining the temperature between 105–110° C. After the addition is complete the temperature is raised to 125–130° C. and maintained until acylation is complete. The reaction mixture is then cooled to room temperature and the product separates as large golden yellow needles which can be isolated by filtration, followed by washing with nitrobenzene, alcohol and drying.

The same product can be produced by chlorinating 1-salicyloylamidoanthraquinone with elemental chlorine until 2 chlorine atoms are introduced in the 3,5-positions. An excellent yield can be obtained. The product obtained by the condensation of 3,5-dichlorosalicylic acid chloride with alpha-aminoanthraquinone is usually more easily purified.

EXAMPLE 2

*Conditioning*

The crude yellow product prepared according to the procedure described in Example 1 is converted into a pigmentary form by dissolving in 95.5% sulfuric acid at 5–10° C., followed by drowning in water. The ratio of product to acid used is 18 parts of product in 280 parts of sulfuric acid followed by drowning in 3000 parts of water-ice mixture. The water-ice mixture may contain a small amount of an oxidizing agent such as sodium perborate, sodium nitrite, or sodium hypochlorite. After stirring for a short period, the precipitated product is isolated by filtration and washed acid-free with water and dilute sodium bicarbonate solution. It is dried to constant weight to 65–75° C., resulting in a bright yellow pigment.

EXAMPLE 3

*1-(3-chlorosalicyloylamido)-anthraquinone*

The process of Example 1 is repeated substituting 18.1 parts of 3-chlorosalicylic acid for the 3,5-dichlorosalicylic acid. Bright large golden yellow needles of 1-(3-chlorosalicyloylamido) - anthraquinone are obtained. The product is conditioned to pigmentary dimensions by the process of Example 2.

EXAMPLE 4

*1-(3-bromosalicyloylamido)-anthraquinone*

The process of Example 1 is repeated substituting 22.8 parts of 3-bromosalicylic acid for the 3,5-dichlorosalicylic acid. The product is conditioned following the process of Example 2. The product, in color and characteristics is remarkably similar to the product of Example 3.

EXAMPLE 5

*1-(3,5-dibromosalicyloylamido)-anthraquinone*

44.7 parts of 1-aminoanthraquinone, and 62.1 parts of 3,5-dibromosalicylic acid are mixed with 360 parts of nitrobenzene and the mixture heated to 110° C. Thereupon a solution of 31 parts of thionyl chloride in 60 parts of nitrobenzene is added gradually with rapid stirring while maintaining the temperature between 110–115° C. After all of the thionyl chloride solution is added, the temperature is raised to 125–130° C., and maintained at this temperature until the reaction is complete. The mixture is then cooled to 90° C., and the pigment which precipitates isolated by filtration, then washed with nitrobenzene, and finally with 95% alcohol. The product is then reslurried in alcohol, filtered again, washed with water, and with a 0.3% sodium-bicarbonate solution. Thereafter the product is washed with water until alkali-free to Brilliant Yellow indicator paper and dried.

The same product can also be produced by direct bromination.

EXAMPLE 6

*1-(3,5-diiodosalicyloylamido)-anthraquinone*

The procedure of Example 5 is followed except that 82 parts of 3,5-diiodosalicylic acid is used in place of the 3,5-dibromo salicylic acid. A bright yellow product is obtained.

EXAMPLE 7

*Conditioning of 1-(3,5-diiodosalicyloylamido)-anthraquinone*

20 parts of crude yellow pigment from Example 6 are dusted into 276 parts of 96% sulfuric acid at 5–10° C., over a period of about 10 minutes with stirring. The mixture is stirred at 10° C. an additional 10 minutes to insure complete solution and 64 parts of xylene sulfonic acid is added. After stirring at 10° C. for 5 minutes, the solution is poured in a thin stream into a rapidly stirred mixture consisting of 1000 parts of water, 1000 parts of ice, and 0.3 part of sodium nitrite. The resulting yellow slurry, which gives a positive test for nitrous acid with starch iodide white paper, is heated to 95° C. with stirring over about a half hour and then held at 95–98° C. for about 15 minutes. The pigment slurry is then cooled to 50–60° C. and the yellow pigment removed by filtration, washed acid-free with water and dried at 60–65° C. to constant weight. The pigment is then pulverized in a mortar. The recovery of the 1-(3,5-diiodosalicyloylamido)-anthraquinone pigment is essentially quantitative, 90–100%.

EXAMPLE 8

*Bleed into white enamel overstripe*

An enamel formulation is prepared using the conditioned pigment from Example 3, and the base color enamel is pulled down on an aluminum panel by means of a .003" Bird applicator and baked at 275° F. for forty-five minutes. After cooling, the top half of the panel is masked off. The bottom half of the exposed part is scuffed with fine sandpaper and a small circle of the base metal is exposed in the center of the scuffed section (for a no-bleed comparison). The entire exposed portion of the panel is then sprayed with white enamel until complete cover is reached. The masking is removed, the panel air dried for 5–10 minutes and baked at 275° F. for forty-five minutes. After cooling, the color and degree of bleed—both on smooth and scuffed surfaces of the panel—are observed.

The area sanded through to the metal shows no bleed, and may be used as a reference for control in evaluating the degree of bleed. The enamel using the pigment from Example 3 showed much less bleed than the unchlorinated control.

We claim:

1. The compound represented by the formula

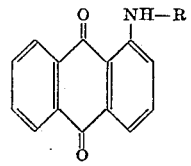

where R is a 3-halosalicyloyl radical.

2. A compound selected from the group consisting of 1-(3,5-dihalosalicyloylamido) - anthraquinone and 1-(3-halosalicyloylamido)-anthraquinone.

3. 1-(3,5-dichlorosalicyloylamido)-anthraquinone.
4. 1-(3,5-dibromosalicyloylamido)-anthraquinone.
5. 1-(3-chlorosalicyloylamido)-anthraquinone.
6. 1-(3-bromosalicyloylamido)-anthraquinone.

References Cited in the file of this patent
UNITED STATES PATENTS

| | | |
|---|---|---|
| 2,041,550 | Krzikalla et al. | May 19, 1936 |
| 2,420,453 | Sutter et al. | May 13, 1947 |